(12) United States Patent
Pattekar et al.

(10) Patent No.: US 8,836,739 B2
(45) Date of Patent: Sep. 16, 2014

(54) METHOD OF FABRICATING LOW-COST TRANSFIX DRUMS FOR SOLID INK TRANSFER

(75) Inventors: Ashish Pattekar, Cupertino, CA (US);
Gregory J Kovacs, Webster, NY (US);
Paul J McConville, Webster, NY (US);
James C Zesch, Santa Cruz, CA (US);
Trevor J. Snyder, Newberg, OR (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 71 days.

(21) Appl. No.: 13/607,458

(22) Filed: Sep. 7, 2012

(65) Prior Publication Data
US 2014/0071198 A1    Mar. 13, 2014

(51) Int. Cl.
*B41J 2/385*    (2006.01)

(52) U.S. Cl.
USPC ........................................... 347/138

(58) Field of Classification Search
USPC .......... 346/138; 347/101, 103, 138–140, 197, 347/198, 220, 213
See application file for complete search history.

(56) References Cited

U.S. PATENT DOCUMENTS

| | | | |
|---|---|---|---|
| 6,357,350 B1 * | 3/2002 | Kerr | 346/138 |
| 2006/0290761 A1 * | 12/2006 | Cellura et al. | 347/103 |
| 2007/0159518 A1 * | 7/2007 | Pan et al. | 347/103 |

* cited by examiner

*Primary Examiner* — Kristal Feggins
(74) *Attorney, Agent, or Firm* — Marger Johnson & McCollom PC

(57) ABSTRACT

A printer has a print head arranged to jet molten ink onto a surface, a transfix surface arranged to provide the surface for the print head, the transfix surface having a core and an outer shell of a predetermined grade of aluminum arranged on the core, the outer shell forming the surface for the print head. The printer also has a transport subsystem to transport a print substrate past the transfix surface such that the molten ink transfers from the transfix surface to the print substrate.

15 Claims, 3 Drawing Sheets

METHOD OF FABRICATING LOW-COST TRANSFIX DRUMS FOR SOLID INK TRANSFER

BACKGROUND

Solid ink jet printers typically dispense or jet molten ink onto either a print substrate directly or onto an intermediate transfer surface. In the case where the printer uses an intermediate transfer surface, the transfer surface typically consists of an aluminum drum made of a specific grade of aluminum, sometimes manufactured under the trade name '3003 A1.' The particular grade of aluminum has appropriate ink-accepting and transfer properties to enable reliable operation of the print systems. The drum may be referred to as a transfix drum. The designation of 3000 means that the aluminum is alloyed with manganese. The particular alloy of 3003 typically has a range of 1.0 to 1.5% weight of manganese and a range of 97 to 98% by weight of aluminum.

Currently, the entire transfix drum consists of the particular grade of aluminum. This contributes to a large portion of the cost of the transfix drum subsystem, in some estimates up to $5/6^{th}$ of the subsystem cost. However, the print system only needs the particular characteristics of the aluminum on the surface of the transfix drum, the entire drum need not be manufactured of that grade of aluminum.

One such approach would use inexpensive stainless steel tubing or other inexpensive material used in a variety of industries. These materials may have the desired diameter and thickness to ensure correct stiffness of the final drum. This drum would then receive a coating of the desired grade of aluminum such as electroplating.

However, metal deposition methods are inherently complicated when it comes to precisely controlling the presence of certain impurities that may be desirable. For example, the presence of manganese as an impurity with the grain structure of the aluminum imparts beneficial properties to the current transfix drum surface that play a critical role in the reliable operation of the print process. This would require process controls and precision that may result in the transfix drum costing more than if it were manufactured entirely out of the proper grade of aluminum.

DETAILED DESCRIPTION OF THE EMBODIMENTS

Figure 1:
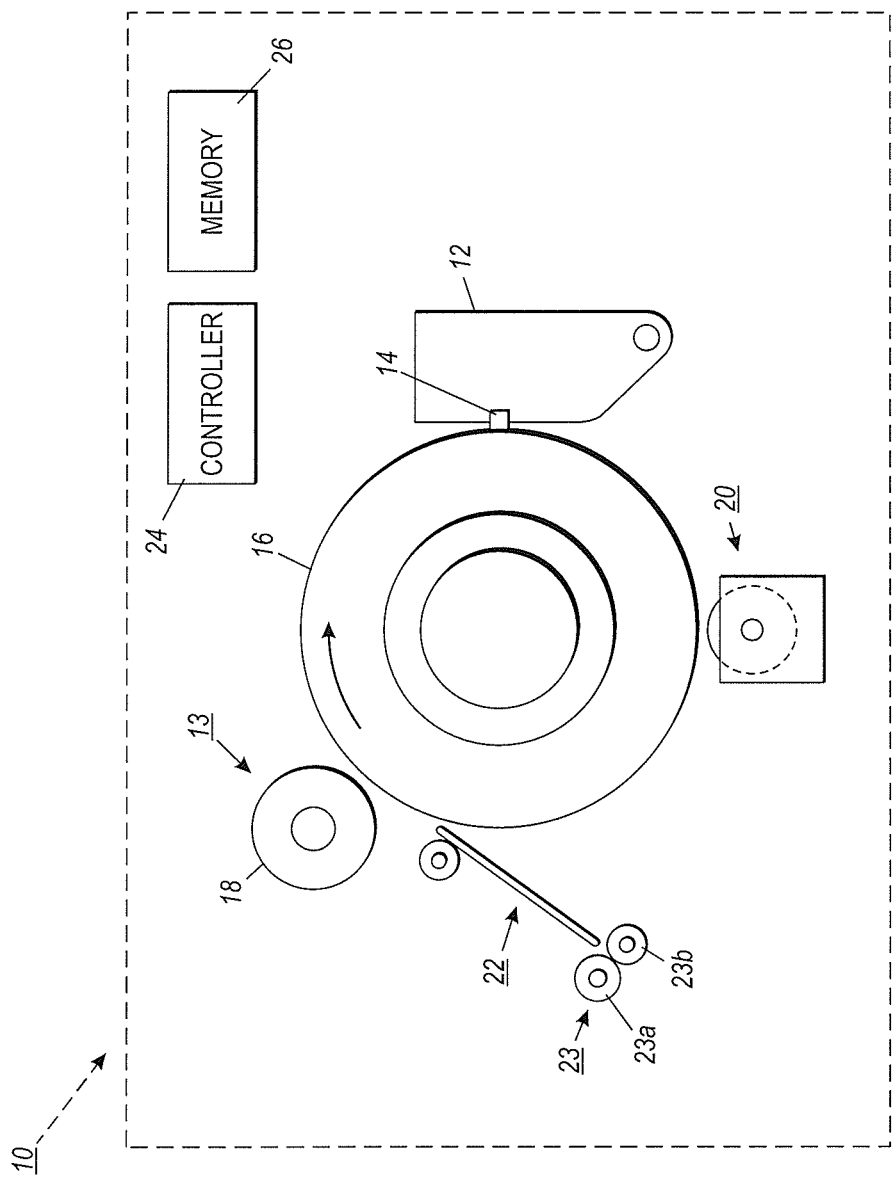
FIG. 1 shows an embodiment of a solid ink jet printing system using an intermediate transfer surface.

FIG. 1 shows a solid ink jet printing system 10 using an intermediate transfer surface. The printer has a print carriage 12 having a print head 14. The print head 14 dispenses ink onto the intermediate transfer surface 16, in this embodiment a drum. The print head dispenses ink under direction of the controller 24 in accordance with image data stored in the memory 26. The surface of the intermediate transfer surface 16 may receive treatment with a release agent 20 that allows any ink on the surface to release onto the print substrate 22.

As the surface 16 moves, it contacts the print substrate as the print substrate passes by a roller 18. The roller servers to transfer and fix, 'transfix' the ink on the surface of the drum to the print substrate. The intermediate transfer surface may be referred to as a transfix surface. The print substrate 22 may be routed by the rollers 23a and 23b to the roller 18. The region where the substrate comes into contact with the intermediate transfer surface may be referred to as the nip.

Figure 2:
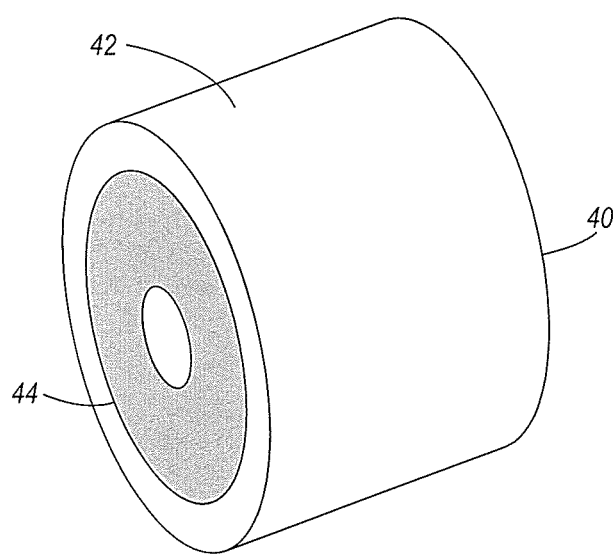
FIG. 2 shows an embodiment of a transfix drum having a base and a shell.

FIG. 2 shows one embodiment of a transfix drum 40. The drum 40 has a core 44 that may consist of many different types of materials. In one embodiment, the core 44 may consist of steel or stainless steel that costs far less than the high grade of aluminum currently in use. The outer surface of the drum 40 consists of a shell 42 of aluminum. This allows the transfix drum to meet the necessary requirements for the printing system, while drastically reducing the costs.

The intermediate transfer surface has certain properties that make it more effective as a transfer surface. The surface must have a particular stiffness when pressed by the roller that brings the print substrate into contact with the surface, such as roller 18. The surface cannot deform or flex in any manner that will affect the quality of the image being transferred to the substrate. The drum must have sufficient stiffness to prevent any flexing of the drum. For example, experiments have shown that any flexing beyond $\frac{1}{1000}$ of an inch across the drum length can degrade image quality. This is merely provided as an example and is not intended to limit the scope of the embodiments or claims in anyway.

The surface must have a certain smoothness, such that the ink remains smooth and without divots or protrusions when it transfers to the substrate. Additionally, the surface must transfer as much of the ink as possible from itself to the paper, with no residue or ink remaining on the surface. This affects both the quality of the image, as any ink not transferred will reduce the vividness and clarity of the image, especially with regard to graininess.

One should note that in this embodiment, the shell 42 fits over the edges of the core 44. The manufacturing process may use this approach, as it does eliminate issues with aligning the edge of an overlay to the drum if it does not fit over the edges. However, other methods of ensuring proper fit of the shell to the core may include undercutting a portion of the aluminum drum into which the shell would fit, having a grooved edge to which the edge of the shell mates, inlaying the shell to the drum, etc.

Figure 3:
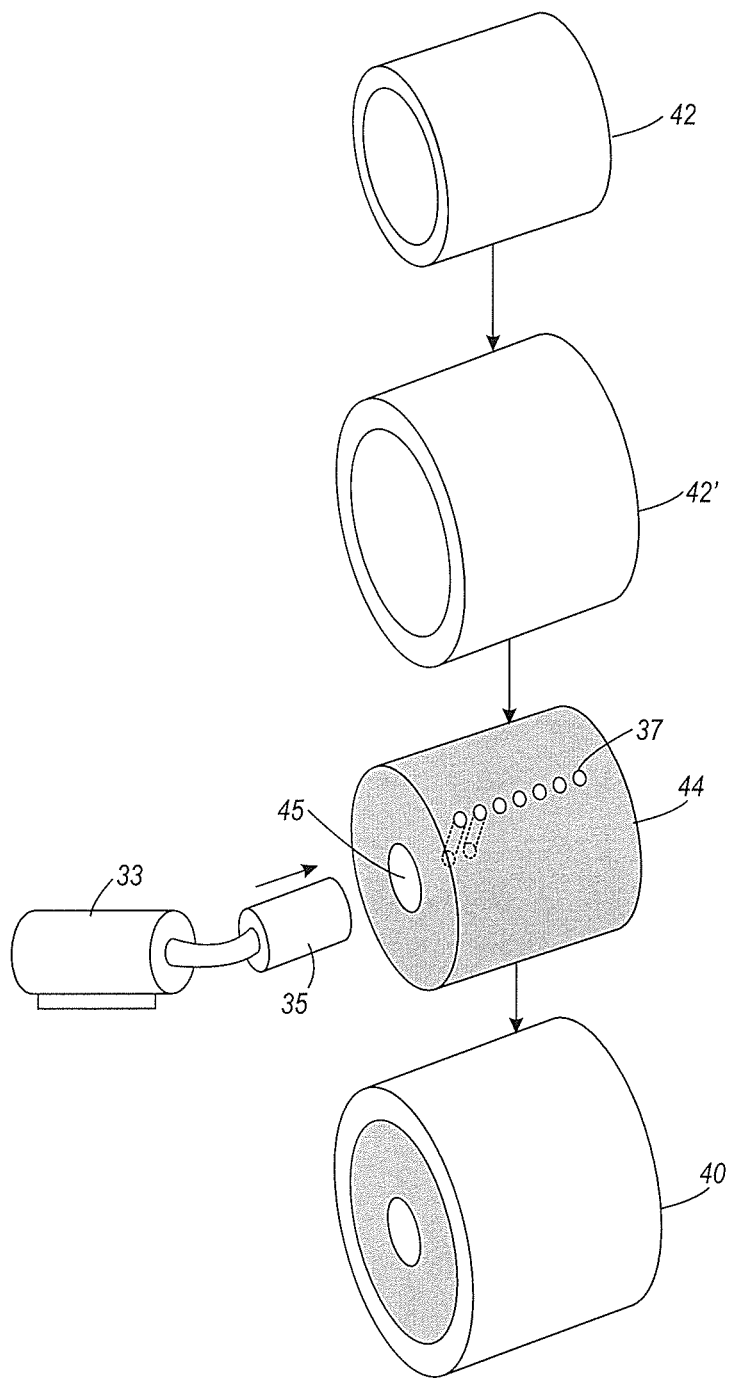
FIG. 3 shows a flowchart of an embodiment of a method of manufacturing a transfix drum with a base and a shell.

FIG. 3 shows an embodiment of a manufacturing process to make a transfix drum having a core and an outer shell. A shell 42 of the appropriate grade of aluminum is formed. The formation may take many forms, such as extrusion, die casting, etc. The resulting shell has a minimum thickness and smoothness required by the printing process. The shell is formed in this embodiment such that the edges of the shell extend beyond the edge of the core and cover a portion of the sides of the core.

The aluminum shell is expanded to allow it to fit over the core, shown as 42'. In one embodiment, the shell is temporarily thermally expanded. The shell then slides over the core 44. The core 44 may have an array of holes such as 37 that penetrate the core to its center bore 45. The center bore allows the core to be mounted on an axel to rotate. The sliding of the shell over the core may be aided by introducing a flow of air over the surface of the core. A pump 33 may have a nozzle 35 that inserts into the center bore 45. This allows air to flow out of the holes such as 37 that penetrate the bore to the surface and aid in the movement of the shell over the core.

The shell will then clamp down onto the core as it cools forming the drum 40. As mentioned above, the edges of the shell extend beyond the edge of the core and cover a portion of the sides of the core, fixing the shell more robustly to the core. This provides a surface appropriate for receiving and releasing ink allowing the drum to operate as a transfix drum, or intermediate printing surface, in a printing system.

One should note that the intermediate transfer surface discussed here consists of a cylindrical drum. However, it is possible that the intermediate transfer surface may take a different form, such as a belt, a plate, etc. (If so, I don't think it would have anything to do with this patent? I don't understand the purpose of this paragraph?)

One should note that the term 'printing system' is not limited only to devices that receive image data from a computer and produce printed output. The term encompasses any device having a print engine, including scanners, fax machines, printers, photo printers, kiosk printers, multi-function peripherals capable of performing more than one of the above functions, etc.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A transfix drum comprising:
   a drum core having an particular stiffness that prevents the drum from flexing; and
   an outer shell of expandable aluminum of a predetermined grade appropriate for use in a solid ink printer arranged over the core, the shell being smooth without divots or protrusions.

2. The transfix drum of claim 1, wherein the drum core consists of steel.

3. The transfix drum of claim 1, wherein the outer shell of aluminum comprises 3003 Aluminum.

4. The transfix drum of claim 1, wherein the drum core has at least one hole on a surface of the core, the hole penetrating the core to a center bore.

5. The transfix drum of claim 1 wherein the shell arranged over the core comprises one of the shell having edges that overhang edges of the core.

6. A printer, comprising:
   a print head arranged to jet molten ink onto a surface;
   a transfix surface arranged to provide the surface for the print head, the transfix surface comprising:
     a core having a particular stiffness that prevents the drum from flexing; and
     an outer shell of a predetermined grade of expandable aluminum, the outer shell forming the surface for the print head; and
   a transport subsystem to transport a print substrate past the transfix surface such that the molten ink transfers from the transfix surface to the print substrate.

7. The printer of claim 6, wherein the transfix surface comprises a drum.

8. The printer of claim 6, wherein the core comprises steel.

9. The printer of claim 6, wherein the core has a center bore and at least one hole on a surface of the core that penetrates the core to the center bore.

10. The printer of claim 6, the transport subsystem comprising one of a series of rollers or a belt.

11. The printer of claim 6, the transport subsystem comprising a roller arranged to bring the print substrate into a region of contact with the transfix surface, the region of contact forming a nip.

12. A method of manufacturing a transfix drum, comprising:
   forming a drum core from a first metal;
   forming an outer shell from a second metal, the second metal being of a predetermined grade of aluminum;
   applying heat to the outer shell sufficient to cause it to expand;
   sliding the outer shell onto the core; and
   allowing the outer shell to cool, causing the outer shell to clamp onto the base.

13. The method of claim 12, wherein the drum base is formed of steel.

14. The method of claim 12, wherein the outer shell is formed of 3003 A1 grade aluminum.

15. The method of claim 12, wherein the core has a center bore and at least one hole on a surface of the core that penetrates to the center bore, the method further comprising applying pressurized air to the center bore to cause air to exit the hole prior to and during the sliding of the outer shell onto the core.

* * * * *